United States Patent [19]
Taniguchi et al.

[11] Patent Number: 4,879,742
[45] Date of Patent: Nov. 7, 1989

[54] CHARGING SYSTEM IN DATA COMMUNICATION NETWORK

[75] Inventors: Hidenobu Taniguchi; Tatsuo Kawatobi, both of Yokohama, Japan

[73] Assignee: Hitachi, Ltd., Tokyo, Japan

[21] Appl. No.: 228,983

[22] Filed: Aug. 5, 1988

[30] Foreign Application Priority Data

Aug. 10, 1987 [JP] Japan .................. 62-198064

[51] Int. Cl.⁴ .......................................... H04M 15/00
[52] U.S. Cl. ..................................... 379/111; 379/130
[58] Field of Search .................. 379/114, 93, 95, 111, 379/112, 130

[56] References Cited

U.S. PATENT DOCUMENTS 4,411,928  7/1984  Hashimoto ........................ 379/130

FOREIGN PATENT DOCUMENTS 60-28360  2/1985  Japan .
62-284560  1/1987  Japan .

Primary Examiner—Stafford D. Schreyer
Attorney, Agent, or Firm—Fay, Sharpe, Beall, Fagan, Minnich & McKee

[57] ABSTRACT

A charging system in a data communication network, there are disposed a first unit for negotiating, prior to effecting a data communication between a calling terminal and a called terminal via the network, charge ratio associated with the calling and called terminals therebetween so as to allow the calling terminal to initiate the data communication on the understanding that the calling terminal and the called terminal agree on the charge ratio, a second unit for charging the calling terminal and the called terminal based on the charge ratio at a disconnection of the call, and a third unit for respectively notifying charge information to the calling terminal and the called terminal.

3 Claims, 14 Drawing Sheets

CHARGING SYSTEM IN DATA COMMUNICATION NETWORK

BACKGROUND OF THE INVENTION

1. Field of the Invention

The present invention relates to a charging system in public and private data communication networks, and in particular to a charging system in which a negotiation of shares of the communication charge can be beforehand conducted when a data communication is achieved between terminals via such networks.

2. Description of the Related Art

According to the conventional charging system, as described in the Japanese patent unexamined publication JP-A-60-28360 published on Feb. 13, 1985, in a case where a calling subscriber and a called subscriber connected to an automatic exchange of a common control method are both to be charged for calls effected therebetween, the charging operation is achieved depending on a message rate specified by the calling subscriber. However, considerations have not been given to an operation to conduct a negotiation of the charging ratio at an establishment of a call between a calling subscriber and a called subscriber and to an operation of the common control automatic exchange to charge both of the calling and called subscribers for the call.

SUMMARY OF THE INVENTION

It is therefore an object of the present invention to provide a charging system in a data communication network in which based on a charging ratio or charge ratio of the communication charge determined through a negotiation between the terminals communicating through the network, the terminals are respectively loaded with communication charge for the call by the network, thereby effecting the charging operation based on the relationship of interests between the communicating parties.

In order to achieve the object above, the charging system in the data communication network according to the present invention, there are disposed first means for negotiating, prior to effecting a data communication between a calling terminal and a called terminal via the network, a charge ratio associated with the calling and called terminals therebetween so as to allow said calling terminal to initiate the data communication on the premise that said calling terminal and said called terminal agree on the charge ratio; second means for charging said calling terminal and said called terminal based on the charge ratio at a disconnection of the call, and third means for respectively notifying charge information to said calling terminal and said called terminal.

In a preferred embodiment according to the present invention, said first means includes means for sending to said called terminal a first packet containing information indicating the charge ratio associated with said calling terminal and said called terminal and desired by said calling terminal, means for sending from said called terminal, in response to said first packet, to said network a second packet containing information indicating a charge ratio desired by said called terminal, said charge ratio being either the charge ratio notified from said calling terminal or another charge ratio attained through a change effected on the charge ratio by said called terminal; and means for enabling said network in response to a reception of said second packet to effect a data communication between said calling terminal and said called terminal and for sending to said calling terminal a third packet containing information indicating the possibility of the data communication therebetween via the network and a charge ratio identical to said charge ratio indicated by said second packet; whereby said calling terminal, on receiving said third packet, can select whether the data communication is to be initiated by agreeing on said charge ratio or the call for the data communication is to be canceled by disagreeing on the charge ratio.

In consequence, only if an agreement is established for the charge ratio between both terminals when a call is to be established, the data communication is achieved and the network charges the terminals for the communication based on the charge ratio, which avoids a case of the prior art where the communication charge calculated according to a charge ratio is imposed on a terminal which does not agree on the charge ratio.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring next to the drawings, description will be given of an embodiment according to the present invention.

Figure 16:
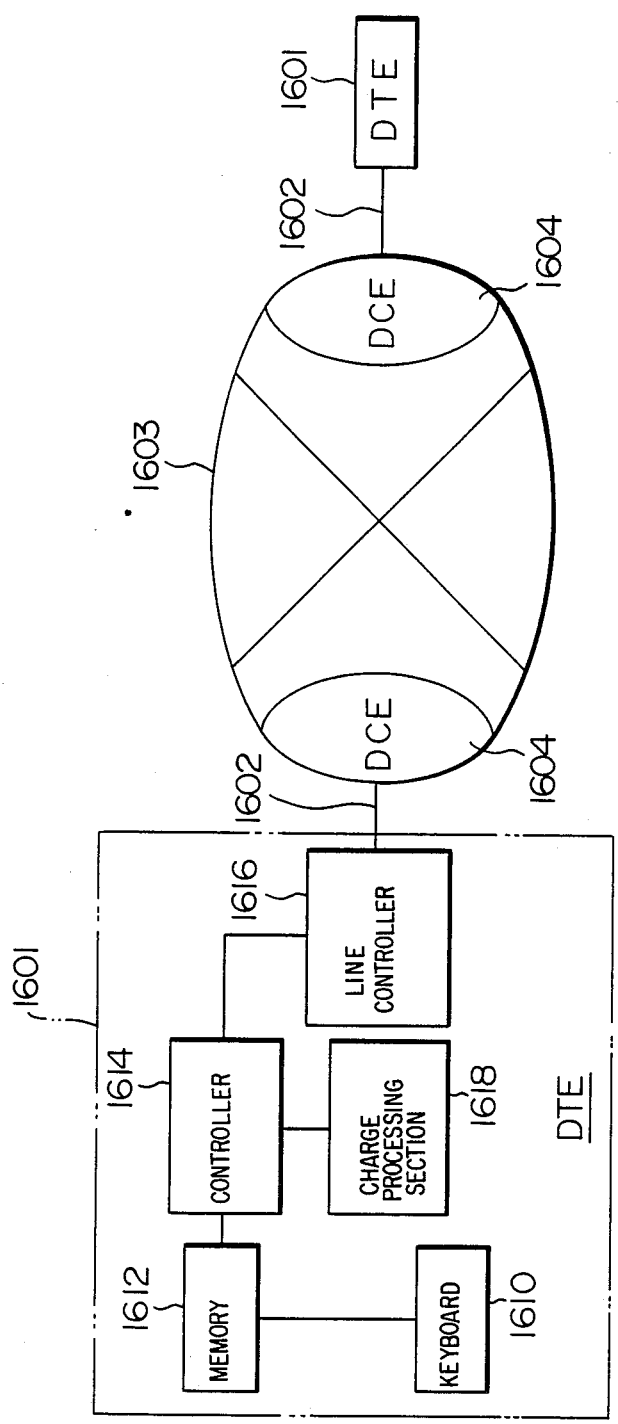
FIG. 16 is a schematic diagram showing an example of a communication system to which the present invention is applied.

FIG. 16 shows a communication system to which the present invention is applied.

In this configuration, reference numeral 1601 indicates a packet terminal or a data terminal equipment (DTE) which is connected to a packet switching network 1603, namely, there is formed a connection via a communication line 1602 to a data circuit terminal equipment (DCE) 1604 of the packet switching network 1603 according to the CCITT Recommendation X.25/PLP DTE-DCE interface such that a call is established via the packet switching network 1603 to the communicating DTE 1601, thereby achieving a packet communication.

The packet terminal 1601 includes a keyboard 1610 for the operator to input data therefrom, a memory 1612, a controller 1614 for controlling send/receive data, and a line controller 1616 for controlling a communication line, which are similar to those known in the art and hence description thereof will be omitted. The packet terminal 1601 further comprises a charge processing section 1618 cooperative with the controller 1614 to achieve various processing in accordance with a charging system of the present invention, which will be described later. The DCE 1604 of the packet switched network 1603 includes the same components as those of the DTE 1601 except for the keyboard 1610 and additionally has functions of controlling the network.

Figure 13:
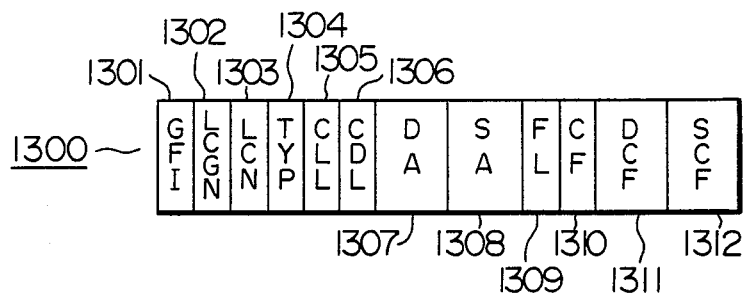
FIG. 13 is a packet format diagram associated with a calling request, a terminating call, a terminating call acceptance, and a connection completion as an embodiment according to the present invention.
Figure 14:
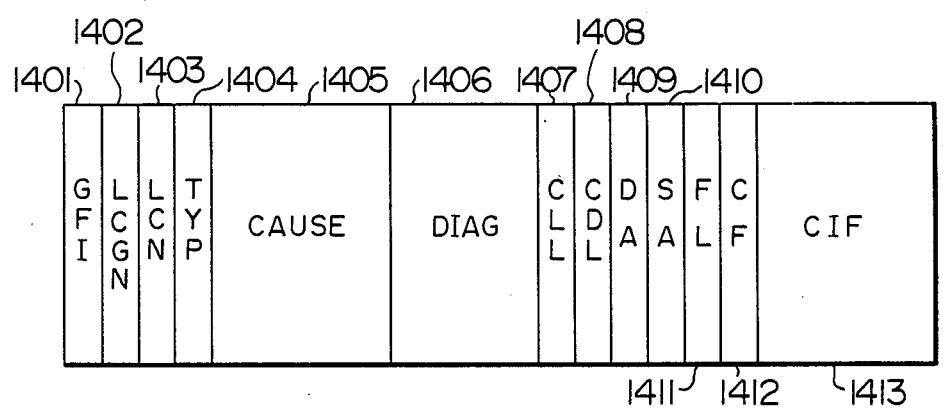
FIG. 14 is a packet format diagram associated with a clear request and a disconnection indication as an embodiment according to the present invention.
Figure 15:
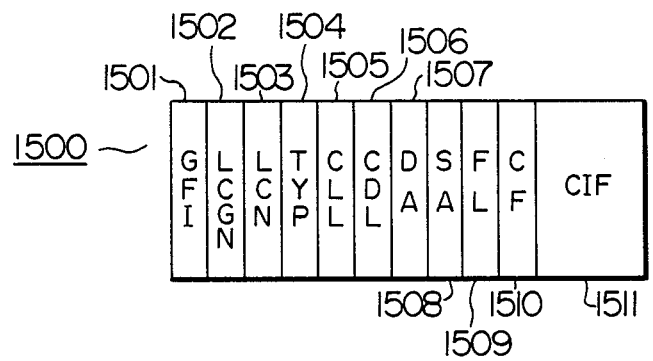
FIG. 15 is a packet format diagram associated with a disconnection confirmation packet as an embodiment according to the present invention.

FIGS. 13 to 15 shows the formats of packets communicated between the DTE 1601 and the DCE 1604 in the communication system to which the present invention is applied.

FIG. 13 shows packet formats associated with the calling request, terminating call, terminating call acceptance or reception, and connection completion packets to be communicated for an establishment of a call between the DTE 1601 and DCE 1604; FIG. 14 shows the formats of the clear request and disconnection indication packets to be communicated at a call disconnection between the DTE 1601 and the DCE 1604; and FIG. 15 shows the format of the disconnection confirmation packet to be communicated at a call disconnection between the DTE 1601 and the DCE 1604.

The configuration of FIG. 13 includes a general format identifier 1301, a logical channel group number 1302, a logical channel number 1303, a packet identifier 1304 indicating a type of the pertinent packet, the length 1305 of the address of the calling DTE, the length 1306 of the address of the called DTE, the address 1307 of the called DTE, the address 1308 of the calling DTE, the length 1309 of the facility, a charge facility code 1310 or a charge identifier denoting that the pertinent facility is a charge facility, a charge ratio 1311 on the called DTE side associated with the communication charge between the calling DTE and the called DTE, a charge ratio 1312 on the calling DTE side associated with the communication charge between the calling DTE and the called DTE.

The configuration of FIG. 14 comprises a general format identifier 1401, a logical channel group number 1402, a logical channel number 1403, a packet identifier 1404 indicating a type of the pertinent packet, a disconnection cause 1405 for a disconnection of the pertinent call, a diagnosis code 1406 for a disconnection of the pertinent call, the length 1407 of the address of the calling DTE, the length 1408 of the address of the called DTE, the address 1409 of the called DTE, the address 1410 of the calling DTE, the length 1411 of the facility, a charge facility code 1412 denoting that the pertinent facility is a charge facility, and charge information 1413 which includes a charge identifier designating a type of the charge and the charge amount of the pertinent call and which is to be contained in a disconnection indication packet.

The configuration of FIG. 15 comprises a general format identifier 1501, a logical channel group number 1502, a logical channel number 1503, a packet identifier 1504 indicating a type of the pertinent packet, the length 1505 of the address of the calling DTE, the length 1506 of the address of the called DTE, the address 1507 of the called DTE, the address 1508 of the calling DTE, the length 1509 of the facility, a charge facility code 1510 denoting that the pertinent facility is a charge facility, and charge information 1511 which includes a charge identifier designating a type of the charge and the charge amount of the pertinent call and which is to be contained in a disconnection indication packet.

Figure 12:
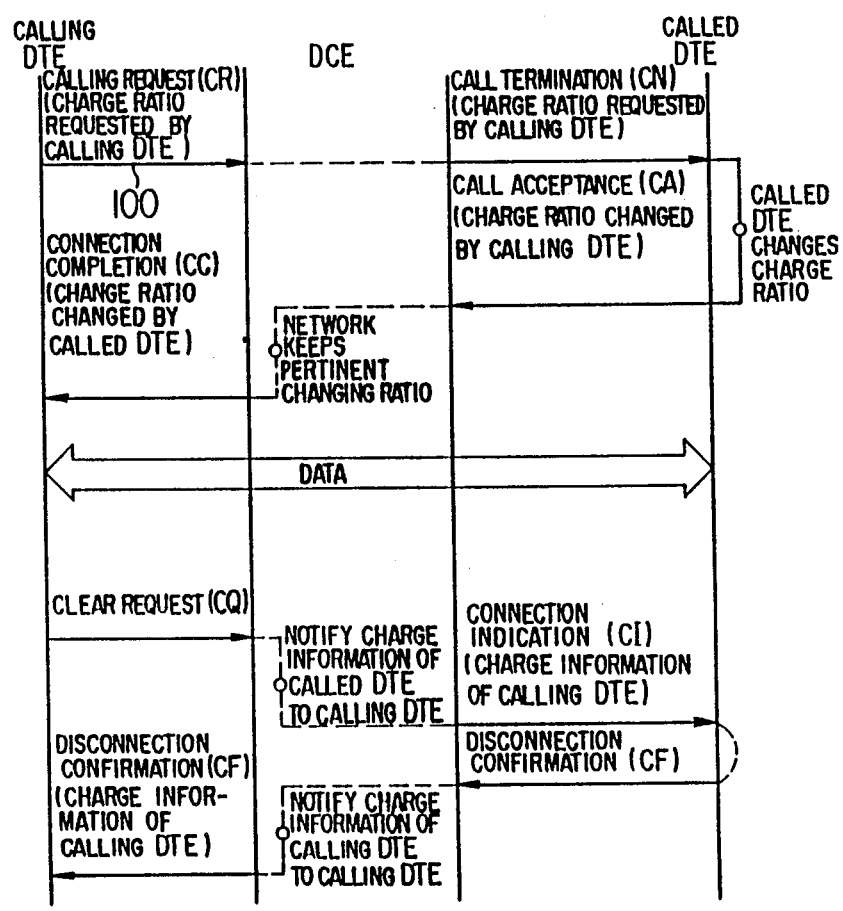
FIG. 12 is a command sequence diagram of a charge processing between a calling DTE and a called DTE as an embodiment according to the present invention.

FIG. 12 is a command sequence of a charge processing associated with operations in which a call is established between a calling DTE and a called DTE, data is communicated by use of the call, and the call is disconnected.

Referring next to FIGS. 1 to 11, description will be given in detail of the charge processing in the calling DTE, the DCE, and the called DTE along the command sequence.

Figure 1:
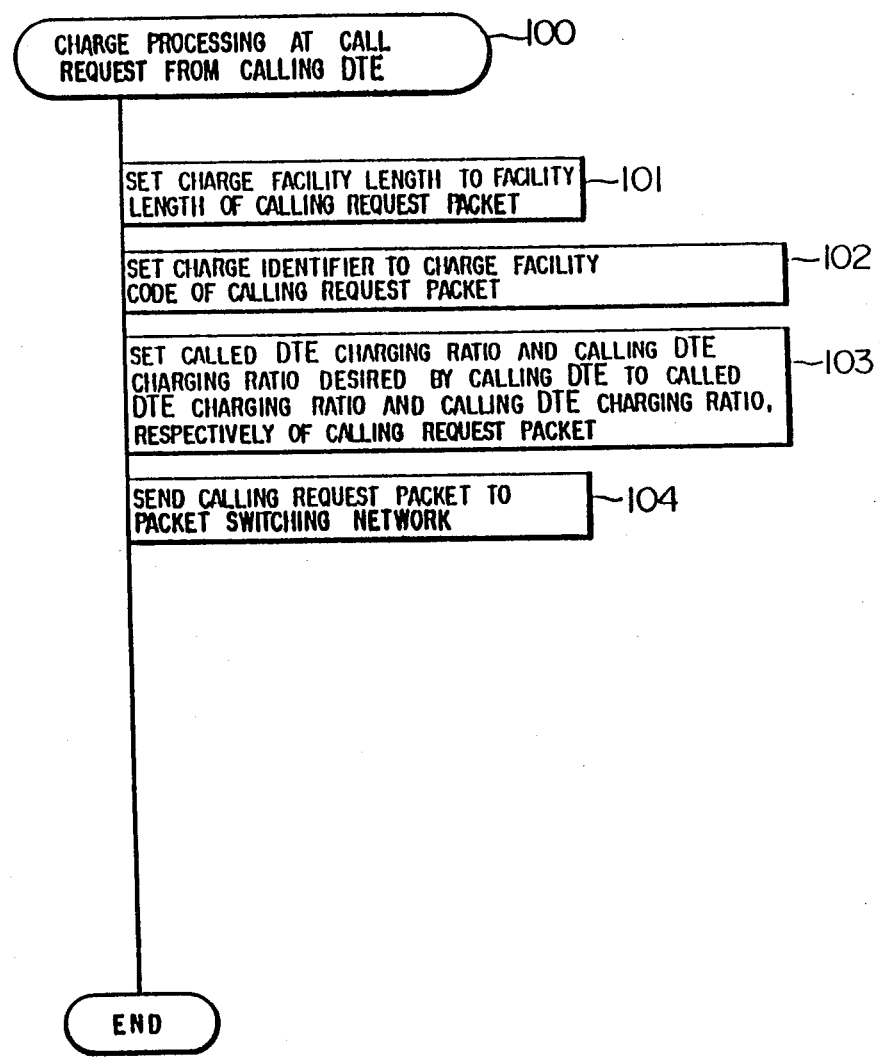
FIG. 1 is a procedure diagram of a charge processing at a call request of a calling DTE as an embodiment according to the present invention.

FIG. 1 shows a charge processing to be executed in the system of FIG. 12 when a calling request is issued from a calling DTE to the DCE. When the operator requests, by the keyboard 1610 of the calling DTE, the calling DTE to establish a call to a desired DTE, the calling DTE reserves a buffer in the memory 1612 for the calling request packet and initiates a calling processing (100) at a calling request of the calling DTE of FIG. 1. The charge processing section 1618 of the calling DTE sets a charge facility length to the facility length 1309 of the calling request packet 1300 (102), loads the called DTE charge ratio 1311 and the calling DTE charge ratio 1312 of the calling request packet 1300 with a called DTE charge ratio and a calling DTE charge ratio desired by the calling DTE, respectively (103), and transmits the calling request packet 1300 to the packet switching network 1603 (104).

Figure 2:
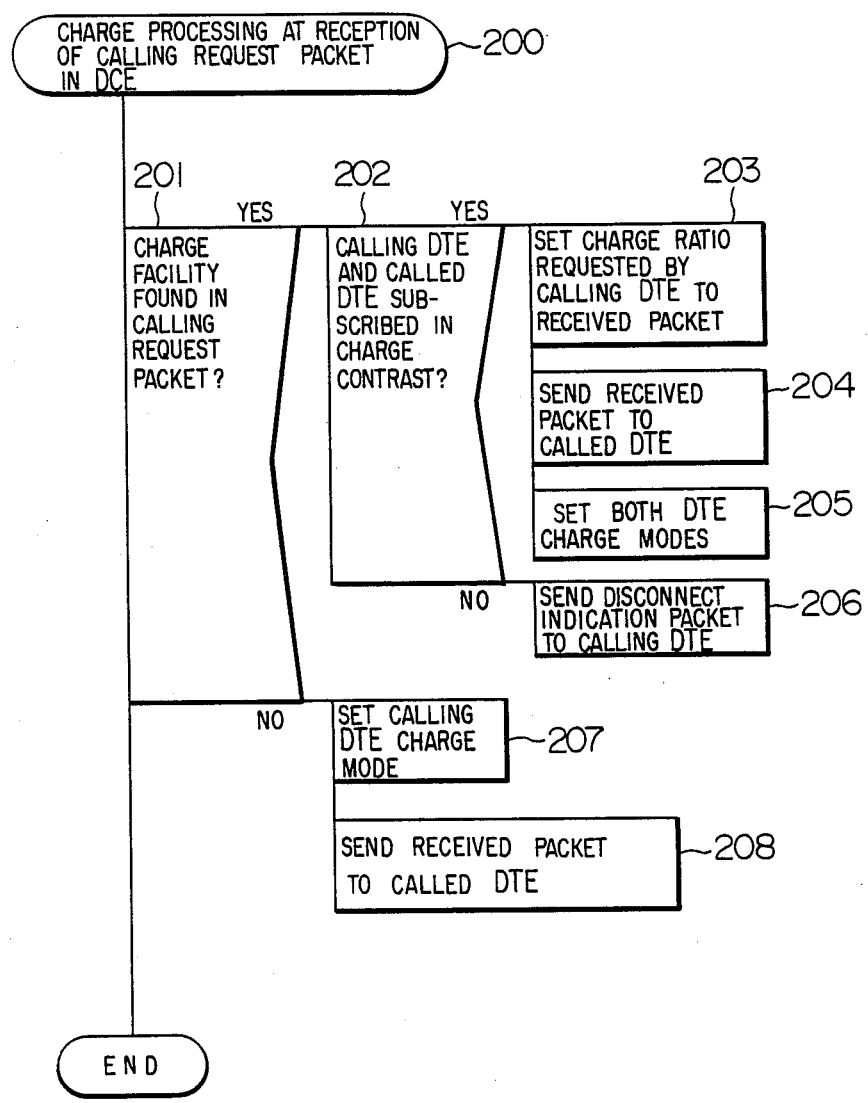
FIG. 2 is a procedure diagram of a charge processing at a reception of a call request packet of a DTE as an embodiment according to the present invention.
Figure 3:
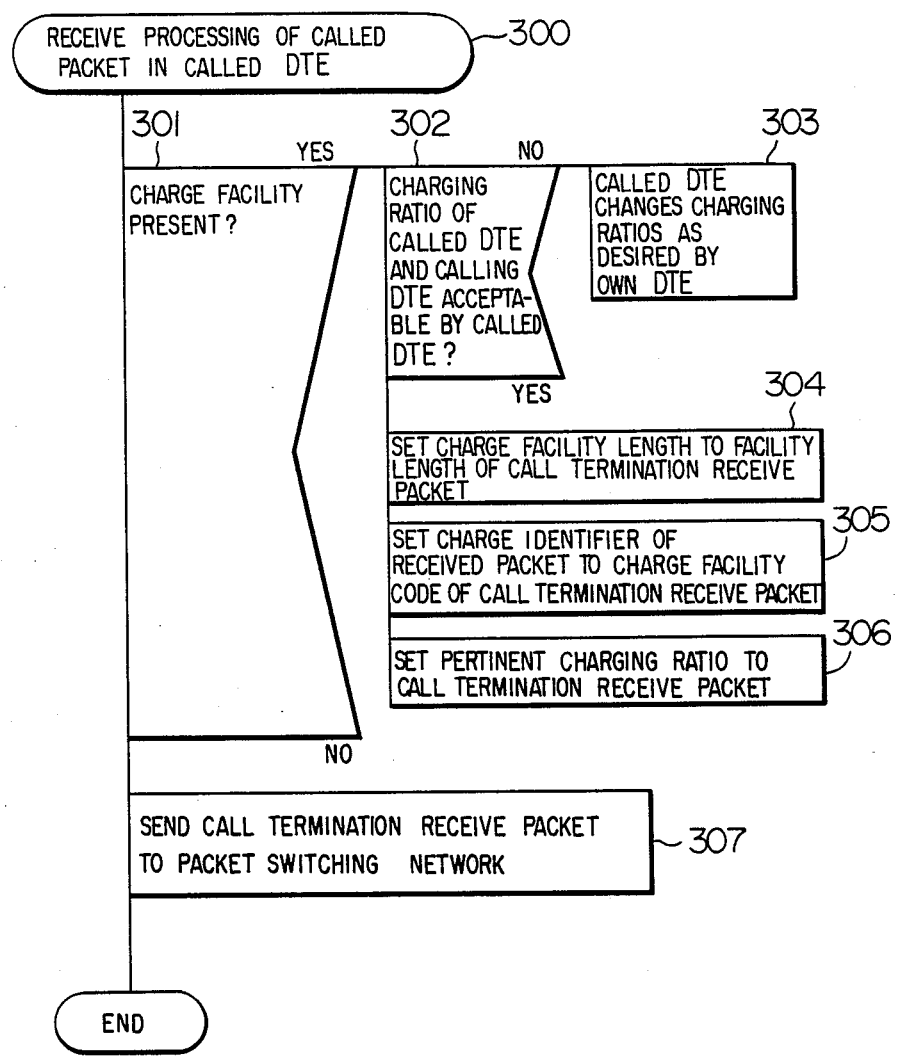
FIG. 3 is a procedure diagram of a charge processing at a reception of a terminating packet of a DTE as an embodiment according to the present invention.
Figure 4:
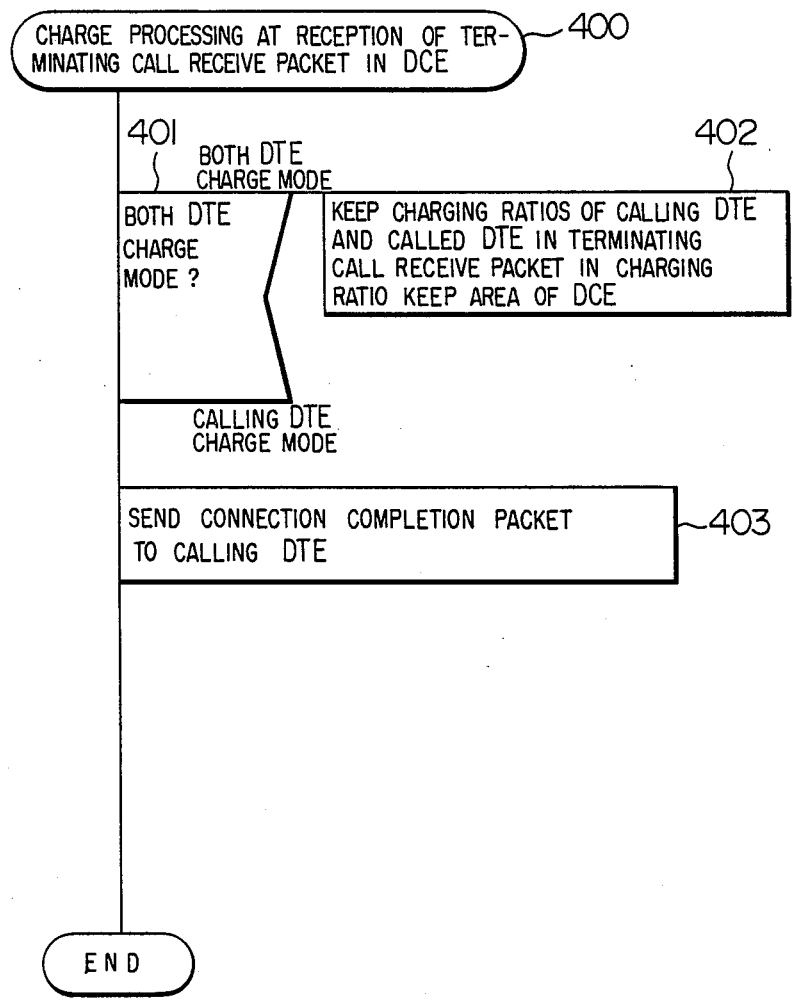
FIG. 4 is a procedure diagram of a charge processing at a reception of a terminating call receive packet of a DTE as an embodiment according to the present invention.

In the configuration of FIG. 12, on receiving the calling request packet, the DCE of the packet switching network 1603 initiates a charge processing (200) at a reception of the calling request packet of the DCE of FIG. 2. It is then judged to determine (201), according to the procedure of FIG. 2, whether or not a charge facility is present in the calling request packet. If this is the case, it is then judged to determine (202) whether or not the calling DTE and the called DTE both subscribe in the charge contract enabling a negotiation on the communication charge to be effected between the DTEs; otherwise, the default mode is assumed, namely, the calling DTE charge mode indicating that the communication charge is imposed entirely on the calling DTE is set to the charge facility code 1310 (207) and then the termination call packet is sent to the called DTE (208). If the calling DTE and the called DTE both subscribe in the charge contract, the charge ratios of the calling DTE and called DTE desired by the calling DTE, respectively, are set to the charge ratio fields 1312 and 1311 of the termination call packet (203), which is then sent to the called DTE (204). In addition, a predetermined field of the memory 1612 is loaded with the both DTE charge mode indicating that both DTEs are to be charged according to the ratios negotiated between the DTEs (205). If neither the calling DTE nor the called DTE subscribes in the charge contract, the disconnection indication packet is sent to the calling DTE (206). Incidentally, the judgement whether or not the calling DTE and the called DTE subscribe in the charge contract of the packet switching network is effected through a collation of them with a table located in a memory of the DCE to indicate the subscribers.

In FIG. 12, on receiving the termination call or call termination packet from the DCE, the called DTE initiates a receive processing (300) of the termination call packet of the called DTE and judges to determine whether or not the termination call packet contains the charge facility (301). If the charge facility is contained, it is judged to determine whether or not the charge ratios of the calling and called DTEs are acceptable by the called DTE (302). If the ratios is not acceptable, the called DTE changes the ratios to the desired values (303), sets the charge facility length to the facility length of the termination call receive packet (304), loads the charge facility code of the termination call receive packet with a charge identifier of the termination call packet (305), sets the pertinent charge ratio to the termination call receive packet (306), and sends the termination call receive packet to the packet switching network (307).

In FIG. 12, on receiving the termination call receive packet from the called DTE, the DCE initiates the receive processing of the termination call receive packet of the DCE (400) and judges to determine whether or not the both DTE charge mode is set (401). If this is the case, the DCE keeps the charge ratios of the calling and called DTEs of the termination call receive packet in the charge ratio keep area (402) and sends the connection completion packet to the calling DTE (403).

The call of the calling DTE is established in this situation, which enables the data to be communicated between the calling DTE and the called DTE.

Figure 5:
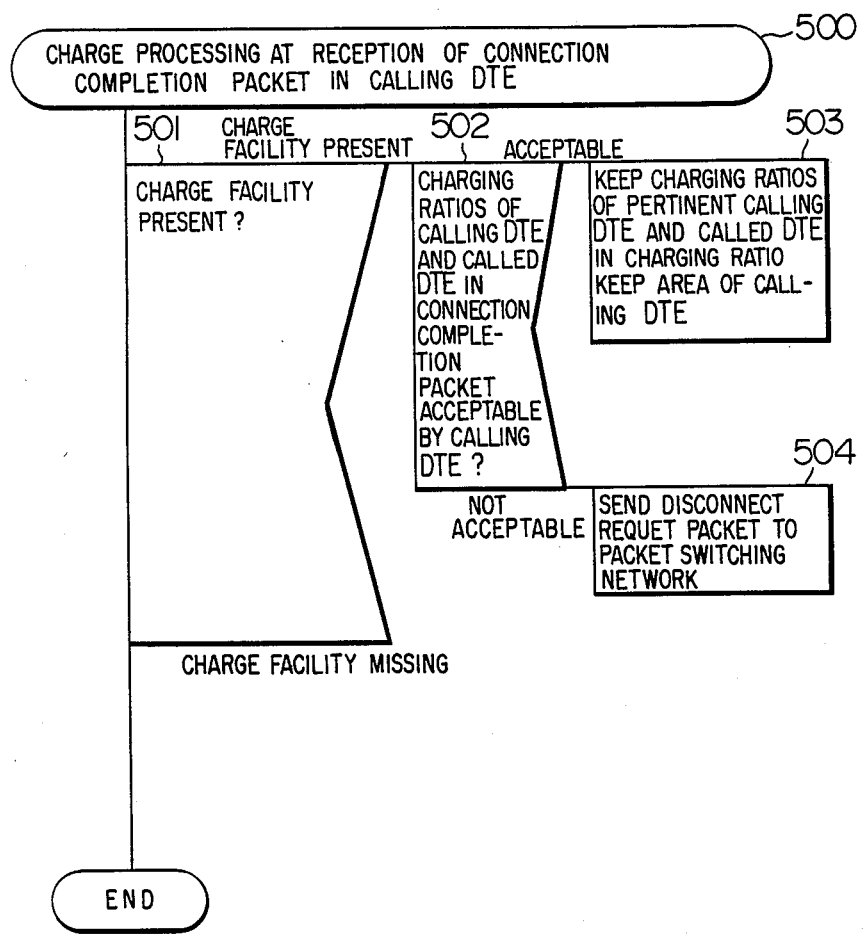
FIG. 5 is a procedure diagram of a charge processing at a reception of a connection completion packet of a calling DTE as an embodiment according to the present invention.
Figure 6:
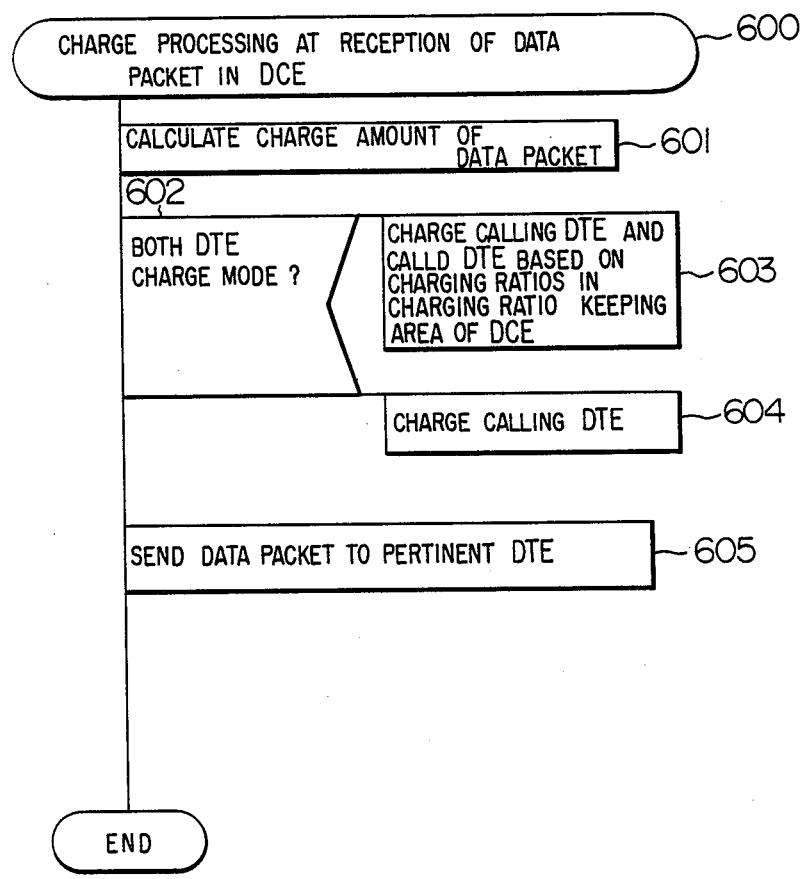
FIG. 6 is a procedure diagram of a charge processing at a reception of a data packet of a DTE as an embodiment according to the present invention.

In the configuration of FIG. 12, on receiving the connection completion packet from the DCE, the calling DTE initiates the charge processing at a reception of the connection completion packet of the calling DTE of FIG. 5 (500) and judges to determine whether or not the connection completion packet contains the charge facility (501). If this is the case, it is judged to determine whether or not the charge ratios of the calling and called DTEs of the connection completion packet are acceptable by the calling DTE (502). If acceptable, the charge ratios of the calling and called DTEs are kept in the charge ratio keep area of the memory of the calling DTE. Contrarily, if the charge ratios are not acceptable, a clear request packet is sent to the packet switching network (504).

In the configuration of FIG. 12, when the data communication becomes possible by use of the call established between the calling DTE and the called DTE, each time the DCE receives a data packet from the calling DTE or the called DTE, the charge processing section 1618 of the DCE 1601 initiates the charge processing at a reception of the data packet (600) so as to calculate the charge amount for the pertinent data packet (601) and then it is judged to determine whether or not the both DTE charge mode is set (602). If the both DTE charge mode is not set, based on the charge ratios in the charge ratio keep area of the memory of the DCE 1601, the calling and called DTEs are charged for the packet (603). In addition, if the calling DTE charge mode is set, the calling DTE is charged (604) and the data packet is sent to the DTE as the destination of the pertinent data packet (605).

Figure 7:
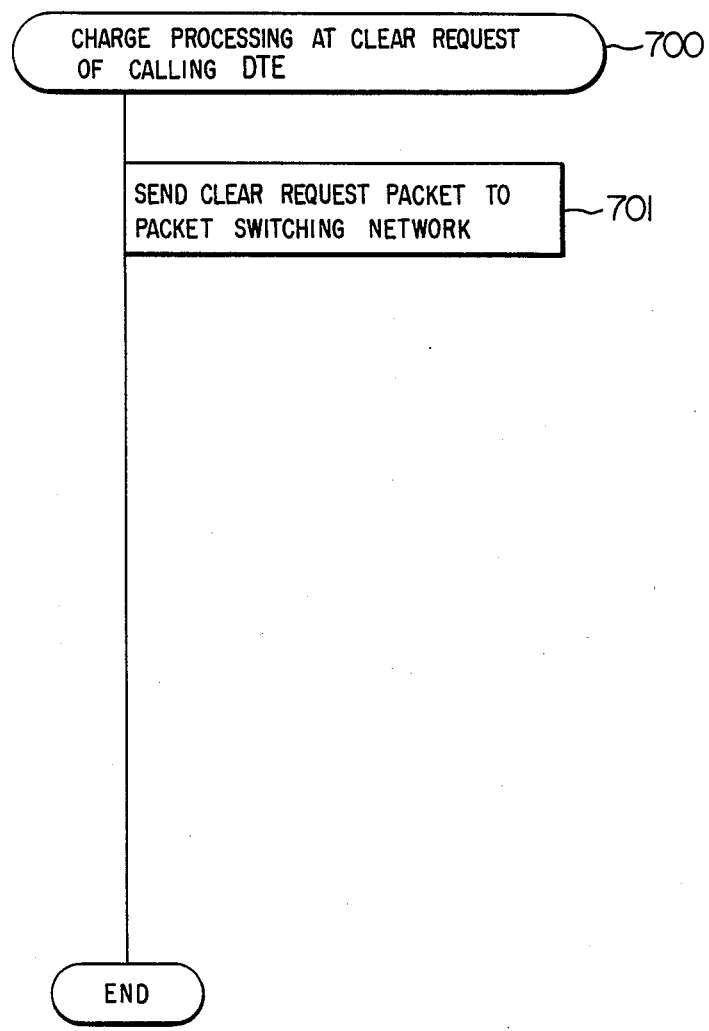
FIG. 7 is a procedure diagram of a charge processing for a clear request of a calling DTE as an embodiment according to the present invention.

In the system of FIG. 12, when the operator at the calling DTE issues a call disconnection to the calling DTE, the calling DTE initiates the charge processing at a clear request of the calling DTE of FIG. 7 (700) so as to send a clear request packet to the packet switching network 1603 (701).

Figure 8:
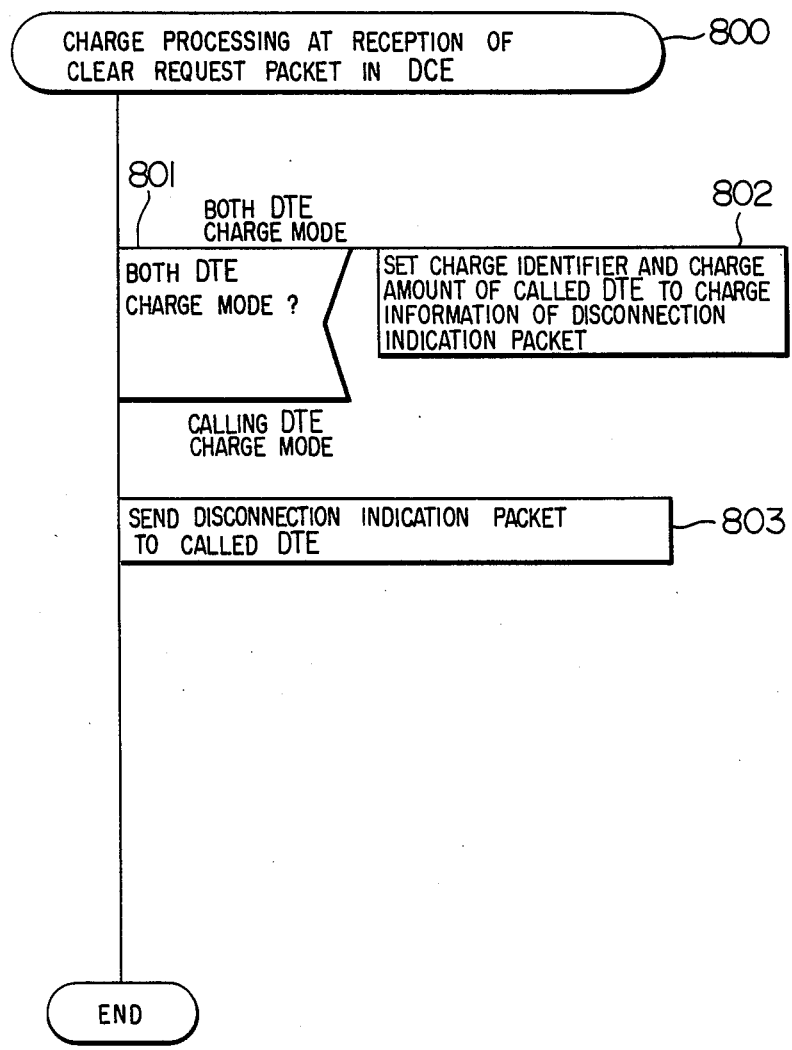
FIG. 8 is a procedure diagram of a charge processing at a reception of a clear request packet of a DTE as an embodiment according to the present invention.

On receiving the clear request packet from the calling DTE, the DCE of FIG. 12 starts the charge processing at a reception of a clear packet of the DCE of FIG. 8 (800) so as to determine whether or not the DCE is in the both DTE charge mode (801). In a case of the both DTE charge mode, a charge identifier and the charge amount of the called DTE are set to the charge information field of the disconnection indication packet (802), which are then sent to the called DTE.

Figure 9:
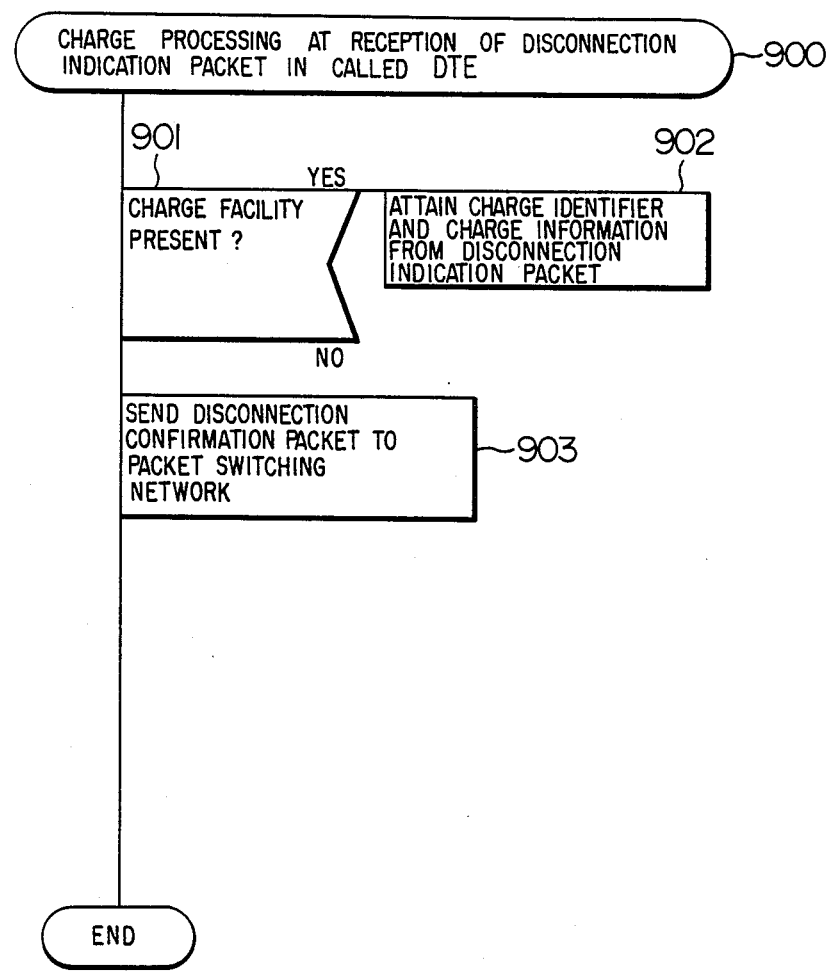
FIG. 9 is a procedure diagram of a charge processing at a reception of a disconnection indication packet of a called DTE as an embodiment according to the present invention.

In the configuration of FIG. 12, on receiving the disconnection indication packet from the DCE, the called DTE initiates the charge processing at a reception of a disconnection indication packet of the called DTE of FIG. 9 (900) and judges to determine whether or not the disconnection indication packet contains the charge facility (901). If the charge facility is present, the charge identifier and the charge information are attained from the disconnection indication packet (902) and a disconnection confirmation packet is transmitted to the packet switching network 1603 (903).

Figure 10:
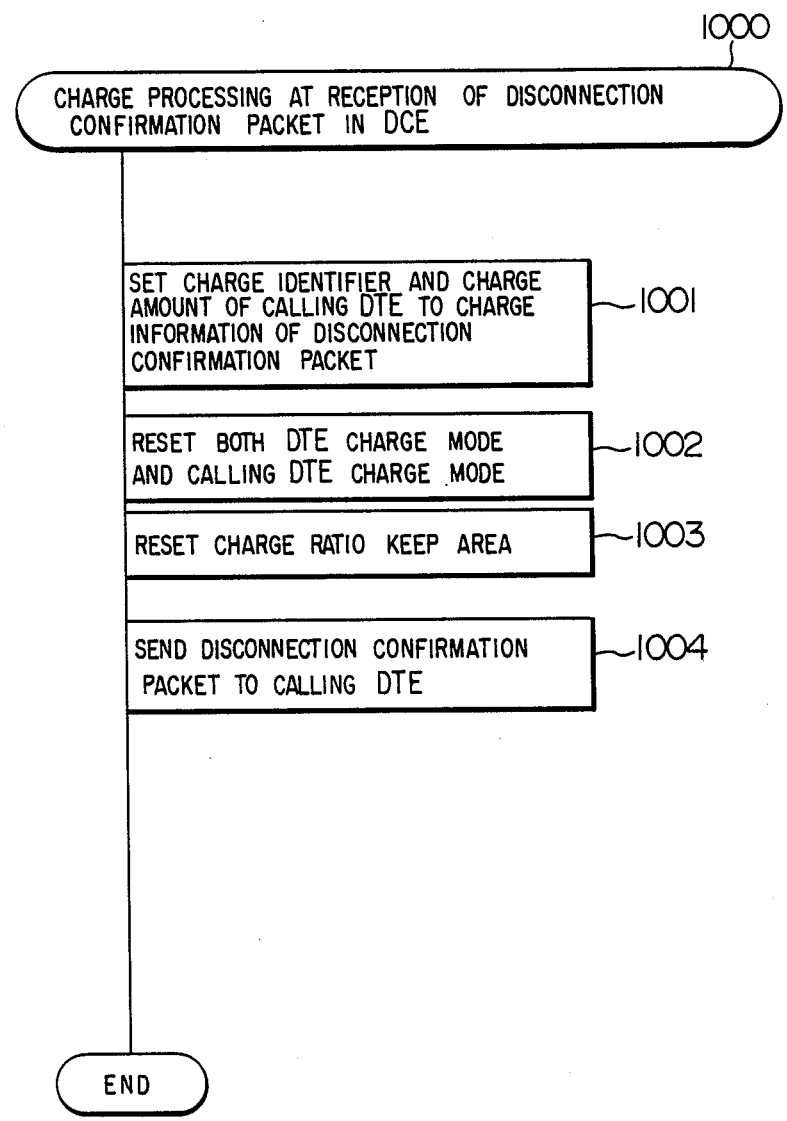
FIG. 10 is a procedure diagram of a charge processing at a reception of a disconnection confirmation packet of a DTE as an embodiment according to the present invention.
Figure 11:
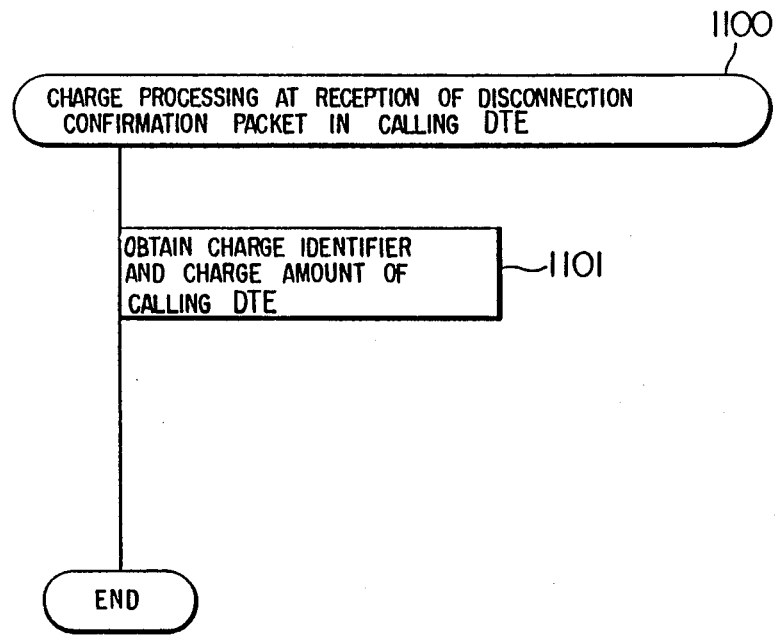
FIG. 11 is a procedure diagram of a charge processing at a reception of a disconnection confirmation packet of a calling DTE as an embodiment according to the present invention.

On receiving the disconnection confirmation packet from the called DTE in the system of FIG. 12, the DCE starts the charge processing at a reception of the disconnection confirmation packet of the DCE of FIG. 10 (1000), sets a charge identifier and the charge amount of the calling DTE to the charge information field of the disconnection confirmation packet (1001), resets the both DTE charge mode and the calling DTE charge mode (1002), resets the charge ratio keep area (1003), and sends the disconnection confirmation packet to the calling DTE (1004).

In the system of FIG. 12, on receiving the disconnection confirmation packet from the DCE, the calling DTE starts the charge processing at a reception of a disconnection confirmation packet of the calling DTE (1100) and obtains the charge identifier and the charge amount of the calling DTE from the disconnection confirmation packet (1101).

According to the present invention, the DCE charges the DTEs for the communication depending on the charge ratios negotiated at the establishment of a call between the calling and called DTEs and hence there does not occur a case where an undue communication charge is imposed on one of the communicating DTEs. That is, based on the relationship of the interests therebetween, the communication charge is divided between the DTEs.

Incidentally, the communication charge to be negotiated between the DTEs may include, in addition to the initial fee for subscription, the monthly regular charge, and the like of the respective DTEs.

In accordance with the present invention, in a communication system including a network and terminals to be connected to the network so as to establish a call for a communication, the communicating terminals negotiate on the charge ratios, namely, on the shares of the communication charge to be imposed thereon such that the network charges the respective terminals based on the results of the negotiation therebetween. Consequently, it is attained as an effect that an undue communication charge is prevented from being imposed on one of the communicating terminals regardless of the interest thereof.

We claim:

1. A charging system in a data communication network comprising:

first means for negotiating, prior to effecting a data communication between a calling terminal and a called terminal via the network, a charge ratio between charges for the data communication to be paid by the calling and called terminals and allowing said calling terminal to initiate the data communication on an agreement between said calling terminal and said called terminal for the charge ratio;

second means for charging said calling terminal and said called terminal based on the charge ratios at a disconnection of the call; and third means for respectively notifying the charge information to said calling terminal and said called terminal.

2. A charging system according to claim 1 wherein said first means includes:

means for sending to said called terminal a first packet containing information indicating a first charge ratio at which the calling terminal desires to divide the charges for the data communication between said calling terminal and said called terminal;

means for sending from said called terminal, in response to said first packet, to said network a second packet containing information indicating a second charge ratio desired by said called terminal, said second charge ratio either the same as said first charge ratio or another charge ratio different from said first charge ratio; and means for enabling said network in response to a reception of said second packet to effect a data communication between said calling terminal and said called terminal and for sending to said calling terminal a third packet containing information indicating the possibility of the data communication therebetween via the network and a third charge ratio which is the same as said second charge ratio; whereby said calling terminal, on receiving said third packet, can select whether the data communication is to be initiated by agreeing on said third charge ratio or the call for the data communication is to be cancelled by disagreeing on the third charge ratio.

3. A charging system according to claim 2 further including fourth means for causing said network, upon receiving said second packet, to store in a memory of said network said second charge ratio and wherein said second means charges said both terminals at said second charge ratio assuming that both terminals agree on said second charge ratio.

* * * * *